United States Patent
Doddaiah (10) Patent No.: US 10,884,935 B1
(45) Date of Patent: Jan. 5, 2021

(54) CACHE ALLOCATION FOR CONTROLLER BOARDS BASED ON PRIOR INPUT-OUTPUT OPERATIONS

(71) Applicant: EMC IP Holding Company LLC, Hopkinton, MA (US)

(72) Inventor: Ramesh Doddaiah, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/587,286

(22) Filed: Sep. 30, 2019

(51) Int. Cl.
*G06F 12/0862* (2016.01)

(52) U.S. Cl.
CPC .... *G06F 12/0862* (2013.01); *G06F 2212/602* (2013.01); *G06F 2212/604* (2013.01)

(58) Field of Classification Search
CPC .................................................. G06F 12/0873
See application file for complete search history.

(56) References Cited

U.S. PATENT DOCUMENTS

| 5,937,428 | A * | 8/1999 | Jantz .................. G06F 3/061 710/37 |
| 6,567,397 | B1 | 5/2003 | Campana et al. |
| 6,687,746 | B1 | 2/2004 | Shuster et al. |
| 6,697,875 | B1 | 2/2004 | Wilson |
| 7,107,403 | B2 * | 9/2006 | Modha .................. G06F 9/5016 709/226 |
| 7,454,437 | B1 | 11/2008 | Lavallee et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,904,681 | B1 | 3/2011 | Bappe et al. |
| 7,925,872 | B2 | 4/2011 | Lai et al. |
| 8,555,279 | B2 * | 10/2013 | Nonaka ............... G06F 9/45558 718/1 |
| 8,825,919 | B1 | 9/2014 | Lim et al. |
| 8,874,746 | B1 | 10/2014 | Gonzalez |

(Continued)

OTHER PUBLICATIONS

Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
Vmware, "Multipathing Configuration for Software iSCSI Using Port Binding," Technical White Paper, Apr. 25, 2012, 15 pages.

(Continued)

*Primary Examiner* — Edward J Dudek, Jr.
(74) *Attorney, Agent, or Firm* — Ryan, Mason & Lewis, LLP (57) ABSTRACT

A metadata structure of a storage array stores metadata associated with a plurality of prior input-output operations. The metadata comprises an indication of which of the controller boards was utilized to service a prior input-output operation and an input-output size for the prior input-output operation. A given input-output operation is obtained and a target controller board and a target portion of the storage array are identified based at least in part on the given input-output operation. A given controller board is determined to have a higher likelihood of receiving a future input-output operation than at least one other controller board based at least in part on the metadata and a portion of the cache is allocated to the given controller board for storing target data associated with the given input-output operation. The target controller board utilizes the portion of the cache allocated to the given controller board to service the input-output operation.

20 Claims, 4 Drawing Sheets

(56) References Cited

U.S. PATENT DOCUMENTS

| | | |
|---|---|---|
| 9,026,694 B1 | 5/2015 | Davidson et al. |
| 9,400,611 B1 | 7/2016 | Raizen |
| 9,594,780 B1 | 3/2017 | Esposito et al. |
| 9,778,852 B1 | 10/2017 | Marshak et al. |
| 10,353,714 B1 | 7/2019 | Gokam et al. |
| 2004/0010563 A1 | 1/2004 | Forte et al. |
| 2006/0277383 A1 | 12/2006 | Hayden et al. |
| 2008/0043973 A1 | 2/2008 | Lai et al. |
| 2011/0197027 A1 | 8/2011 | Balasubramanian et al. |
| 2011/0296230 A1 | 12/2011 | Chen et al. |
| 2014/0351627 A1* | 11/2014 | Best ............... G06F 3/0644 714/6.11 |
| 2015/0081981 A1* | 3/2015 | McKean ......... G06F 12/0871 711/136 |
| 2015/0222705 A1 | 8/2015 | Stephens |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2018/0113640 A1* | 4/2018 | Fernandez ........... G06F 3/061 |
| 2018/0189635 A1 | 7/2018 | Olarig et al. |
| 2019/0095299 A1 | 3/2019 | Liu et al. |
| 2019/0108888 A1 | 4/2019 | Sarkar et al. |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. filed Dec. 21, 2017 and entitled "Storage System with Input-Output Performance Control Utilizing Application Process Detection."

U.S. Appl. No. 15/795,653 filed in the name of Maneesh Pusalkar et al. filed Oct. 27, 2017 and entitled "Storage System with Network-Wide Configurable Device Names."

U.S. Appl. No. 16/142,274 filed in the name of Sanjib Mallick et al. filed Sep. 26, 2018 and entitled "Host Device with Multi-Path Layer Implementing Automatic Standby Setting for Active-Active Configuration."

* cited by examiner

| TID METADATA | 304-1 | 304-2 | 304-3 | 304-4 |
|---|---|---|---|---|
| TID 1 | BOARD B AND BLOCKS IN CACHE (8K) | BOARD A AND BLOCKS IN CACHE (16K) | BOARD C AND BLOCKS IN CACHE (16K) | BOARD D AND BLOCKS IN CACHE (8K) |
| TID 2 | BOARD D AND BLOCKS IN CACHE (16K) | BOARD C AND BLOCKS IN CACHE (16K) | BOARD A AND BLOCKS IN CACHE (16K) | BOARD A AND BLOCKS IN CACHE (16K) |
| TID 3 | BOARD A AND BLOCKS IN CACHE (16K) | BOARD B AND BLOCKS IN CACHE (16K) | BOARD D AND BLOCKS IN CACHE (16K) | BOARD C AND BLOCKS IN CACHE (16K) |
| TID 4 | BOARD B AND BLOCKS IN CACHE (32K) | BOARD C AND BLOCKS IN CACHE (8K) | BOARD A AND BLOCKS IN CACHE (16K) | BOARD D AND BLOCKS IN CACHE (16K) |
| TID 5 | BOARD B AND BLOCKS IN CACHE (16K) | BOARD B AND BLOCKS IN CACHE (16K) | BOARD C AND BLOCKS IN CACHE (16K) | BOARD A AND BLOCKS IN CACHE (16K) |
| TID 6 | BOARD C AND BLOCKS IN CACHE (16K) | BOARD B AND BLOCKS IN CACHE (16K) | BOARD C AND BLOCKS IN CACHE (16K) | BOARD D AND BLOCKS IN CACHE (16K) |
| TID 7 | BOARD A AND BLOCKS IN CACHE (32K) | BOARD B AND BLOCKS IN CACHE (32K) | BOARD C AND BLOCKS IN CACHE (32K) | BOARD D AND BLOCKS IN CACHE (32K) |
| ... | | | | |
| TID P | BOARD C AND BLOCKS IN CACHE (8K) | BOARD B AND BLOCKS IN CACHE (32K) | BOARD A AND BLOCKS IN CACHE (16K) | BOARD D AND BLOCKS IN CACHE (16K) |

US 10,884,935 B1

CACHE ALLOCATION FOR CONTROLLER BOARDS BASED ON PRIOR INPUT-OUTPUT OPERATIONS

FIELD

The field relates generally to information processing systems, and more particularly to storage in information processing systems.

BACKGROUND

Storage arrays and other types of storage systems are often shared by multiple host devices over a network. A host device may comprise a multipath input-output (MPIO) driver that is configured to process input-output (IO) operations for delivery from the host device to the storage system. The MPIO drivers are configured to distribute IO operations across multiple paths to the same portion of the storage array, also known as a track. For example, a track may comprise a grouping of blocks or sectors of the storage array. From the storage array side, it is often difficult to predict which path an MPIO driver will utilize to service a given IO operation.

SUMMARY

In one embodiment, an apparatus comprises a storage array comprising at least one processing device. The storage array comprises a plurality of controller boards and a cache. The cache comprises a metadata structure. The metadata structure stores metadata associated with a plurality of prior input-output operations. Each of the prior input-output operations is directed to a corresponding portion of the storage array. The metadata associated with each prior input-output operation comprises an indication of which of the plurality of controller boards was utilized to service that prior input-output operation and an input-output size for that prior input-output operation. The least one processing device of the storage array is configured to obtain a given input-output operation from a host device and to identify a target controller board of the plurality of controller boards and a target portion of the storage array based at least in part on the obtained given input-output operation. The at least one processing device is further configured to determine, based at least in part on the metadata stored in the metadata structure, a likelihood that a given controller board of the plurality of controller boards will receive a future input-output operation, and to determine, based at least in part on the likelihood, that the given controller board has a higher likelihood of receiving a future input-output operation than at least one other controller board of the plurality of controller boards. The at least one processing device is further configured to allocate a portion of the cache to the given controller board as the buffer for storing target data associated with the given input-output operation and to service the given input-output operation by the target controller board where the target controller board utilizes the buffer allocated to the given controller board to service the input-output operation.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
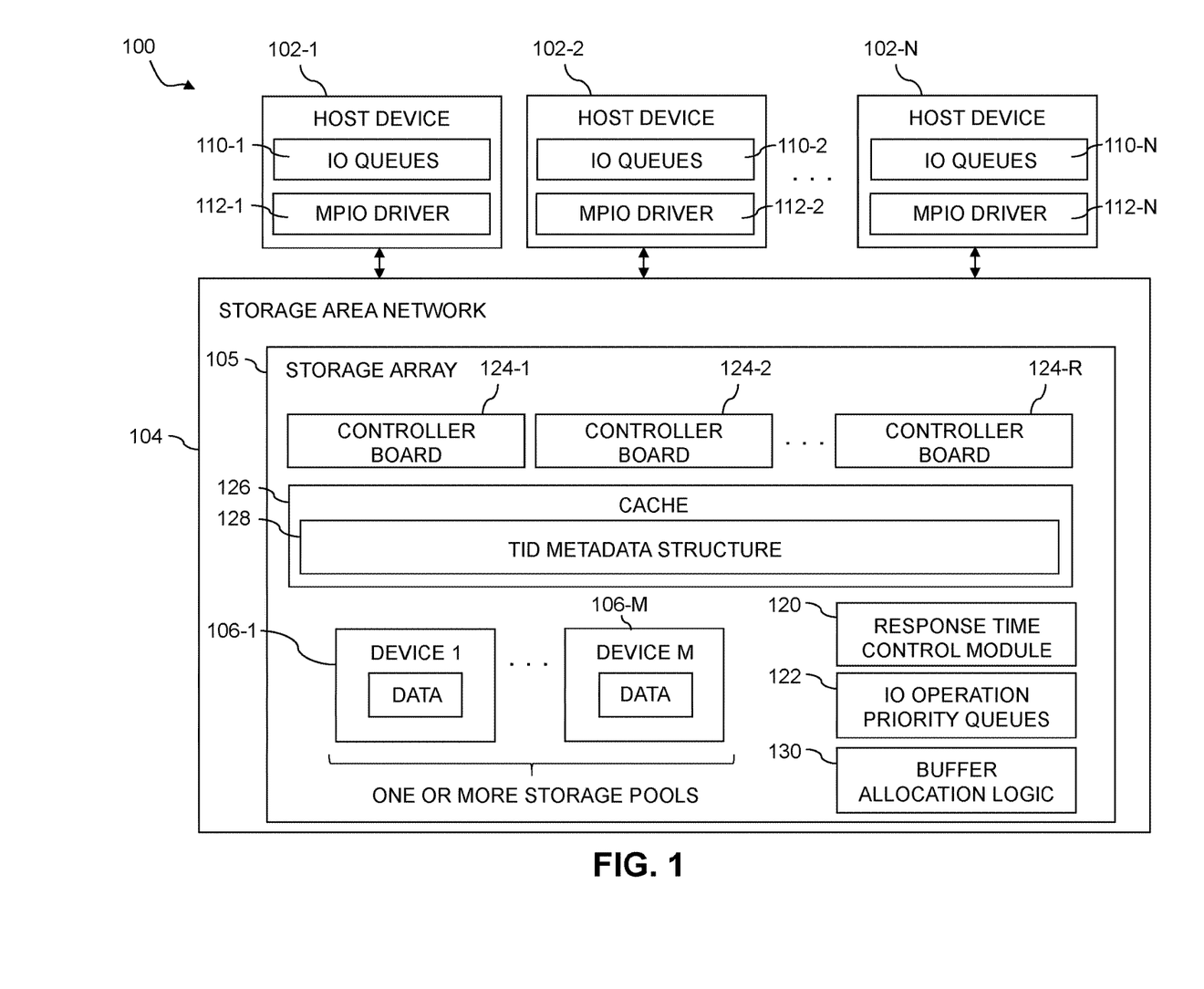
FIG. 1 is a block diagram of an information processing system configured with functionality for storage array cache buffer allocations using track identifier (TID) metadata in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical volumes such as, e.g., logical units (LUNs), that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands or non-volatile memory express (NVMe) commands, although other types of commands can be used in other embodiments. A given IO operation, as that term is broadly used herein, illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths. In illustrative embodiments, with reference also to the example of FIG. 2, each of the host devices 102 comprises one or more hardware bus adapter (HBA) ports 200, e.g., HBA ports 200-1 and 200-2 in the example of FIG. 2, which are utilized to communicate with the storage array 105 via the SAN 104. In some embodiments, the HBA ports 200 are referred to as initiators for the IO paths. For example, the HBA port 200-1 of host device 102-1 may be referred to as initiator 1 (I1) and the HBA port 200-2 of host devices 102-1 may be referred to as initiator 2 (I2). HBA ports 200 may comprise any circuitry that is configured to enable communication between the host devices 102 and the storage array 105 or any other devices.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint® memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, (now U.S. Pat. No. 10,474,367), filed Dec. 21, 2017, and entitled "Storage System with Input-Output Performance Control Utilizing Application Process Detection," which is incorporated by reference herein.

In illustrative embodiments, storage array 105 also comprises a plurality of controller boards 124-1, 124-2, . . . 124-R and a cache 126. In some embodiments, storage array 105 may comprise one controller board 124, two controller boards 124 or any other number of controller boards 124. In illustrative embodiments, controller boards 124 comprise processing devices, memory, or other circuitry that may be used to service input-output operations that are received from the host devices 102. While controller boards 124 may be described as comprising particular configurations herein, controller boards 124 are not limited to the disclosed embodiments and may comprise any other configuration of electrical and software components that may be utilized to service input-output operations that are received from host devices 102 by storage array 105. With reference also to the example of FIG. 2, in some embodiments, each of the controller boards 124 comprises one or more ports 202, which are utilized to communicate with the host devices 102 via the SAN 104.

Figure 2:
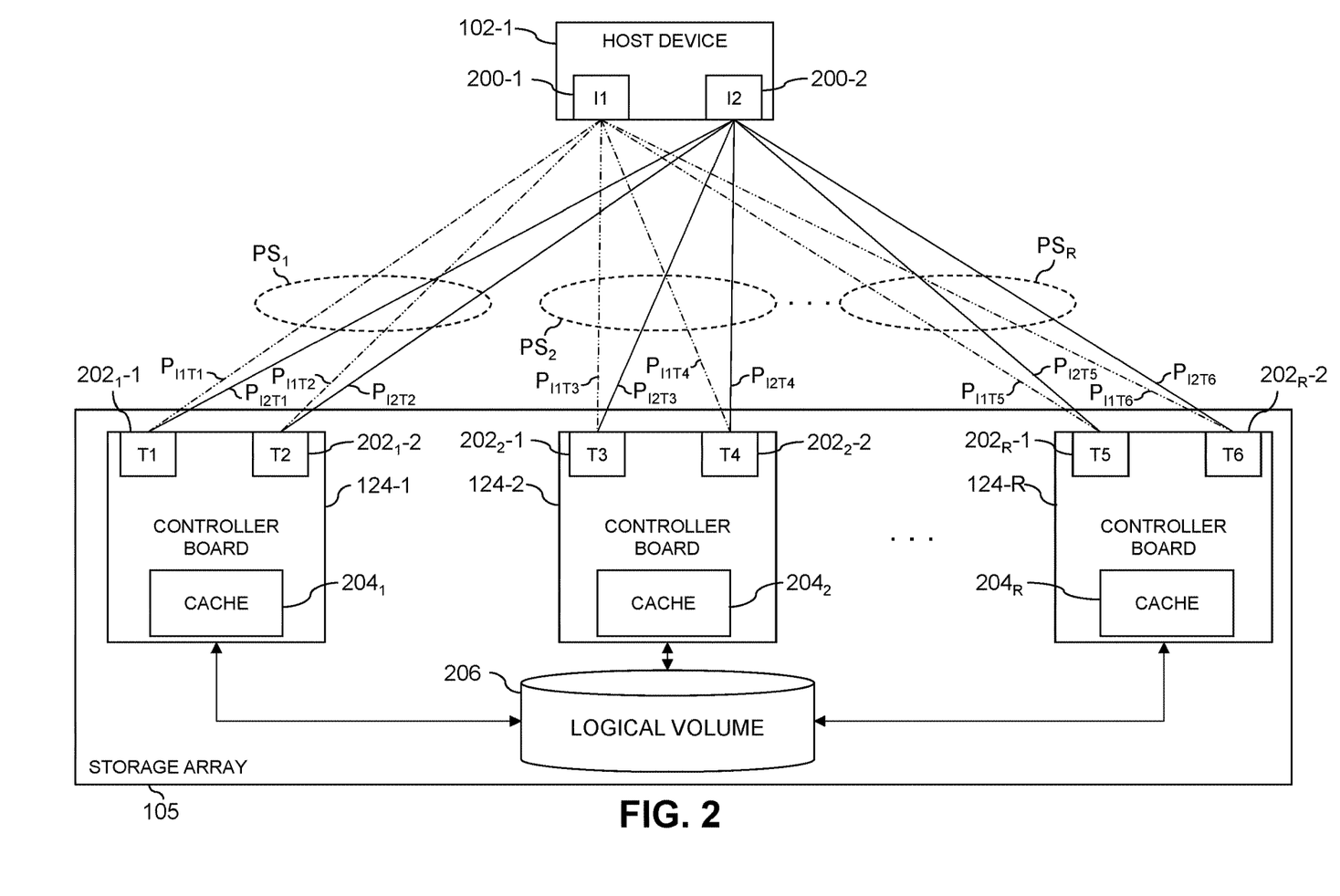
FIG. 2 is a block diagram illustrating paths between a host device and controller boards of the information processing system of FIG. 1 in an illustrative embodiment.

In the example shown in FIG. 2, controller board 124-1 comprises ports $202_1$-1 and $202_1$-2, controller board 124-2 comprises ports $202_2$-1 and $202_2$-2, . . . and controller board 124-R comprises ports $202_R$-1 and $202_R$-2. In some embodiments, the ports 202 are referred to as targets for the IO paths. For example, in the illustrated example, the ports $202_1$-1 and $202_1$-2 of controller board 124-1 may be referred to as targets 1 (T1) and 2 (T2) respectively, the ports $202_2$-1 and $202_2$-2 of controller board 124-2 may be referred to as targets 3 (T3) and 4 (T4) respectively, and the ports $202_R$-1 and $202_R$-2 of controller board 124-R may be referred to as targets 5 (T5) and 6 (T6) respectively.

The cache 204 of each of the controller boards 124 comprise one or more memory devices such as, e.g., random access memory (RAM), read-only memory (ROM), flash memory or other types of memory, in any combination.

In some embodiments, cache 126 is a global cache that is separate from and accessible by all of the controller boards 124. Cache 126 may comprise one or more memory devices such as, e.g., random access memory (RAM), read-only memory (ROM), flash memory or other types of memory, in any combination. In some embodiments, the caches 204 of one or more of the controller boards 124 may together comprise some or all of cache 126. In illustrative embodiments, cache 126 comprises a track identifier (TID) metadata structure 128 which will be described in more detail below.

Storage array 105 also comprises buffer allocation logic 130 which comprises functionality for storage array buffer allocations and performing other functions of the storage array 105 utilizing the TID metadata such as that found in TID metadata structure 128, as will be described in more detail below. In some embodiments, one or more of controller boards 124 may execute the buffer allocation logic 130. In some embodiments, buffer allocation logic 130 may alternatively be executed by another processing device associated with the storage array 105. In illustrative embodiments, buffer allocation logic 130 may be stored in the persistent cache of the storage array 105, store in cache 126, stored in the respective caches 204 of one or more of the controller boards 124, or stored in any other memory device of the storage array 105.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

The host devices 102 comprise respective sets of IO queues 110-1, 110-2, . . . 110-N and respective MPIO drivers 112-1, 112-2, . . . 112-N. The MPIO drivers 112 collectively comprise a multipath layer of the host devices 102.

MPIO drivers typically group all paths from a host device to a logical volume, such as a LUN, into a single logical device known as a multipath logical device. The individual block devices representing each path are known as native devices. Applications use a multipath logical device for IO operations so that the IO operations may be distributed across all available paths. When paths fail, the MPIO driver will typically redirect the IO operations to other alive paths in the multipath logical device.

The MPIO drivers described herein may comprise, for example, otherwise conventional MPIO drivers, such as PowerPath® drivers from Dell EMC, suitably modified in the manner disclosed herein to provide functionality for storage array buffer allocations using TID metadata. Other types of MPIO drivers from other driver vendors may be suitably modified to incorporate functionality for storage array buffer allocations using TID metadata as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

With reference again to the example of FIG. 2, host device 102-1 comprises a multipath logical device that includes a plurality of paths P between the host device 102-1 and a logical volume 206 of the storage array 105. Each path P comprises an initiator and a target. For example, a path $P_{I1T1}$ from host device 102-1 to the logical volume 206 comprises initiator I1 (i.e., HBA port 200-1 of host device 102-1) and target T1 (i.e. port $202_1$-1 of controller board 124-1). Paths $P_{I2T1}$, $P_{I1T2}$, $P_{I2T2}$, $P_{I1T3}$, $P_{I2T3}$, $P_{I1T4}$, $P_{I2T4}$, $P_{I1T5}$, $P_{I2T5}$, $P_{I1T6}$, $P_{I2T6}$ similarly comprise respective initiators and targets as illustrated. The paths P of the multipath logical device that utilize the same controller board 124-1 may also be grouped together as path sets PS. As illustrated in FIG. 2, for example, paths $P_{I1T1}$, $P_{I2T1}$, $P_{I1T2}$ and $P_{I2T2}$ utilize controller board 124-1 and are grouped together into a path set $PS_1$; paths $P_{I1T3}$, $P_{I2T3}$, $P_{I1T4}$ and $P_{I2T4}$ utilize controller board 124-2 and are grouped together into a path set $PS_2$; and paths $P_{I1T5}$, $P_{I2T5}$, $P_{I1T6}$ and $P_{I2T6}$ utilize controller board 124-R and are grouped together into a path set $PS_R$.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

MPIO drivers usually distribute IO operations across multiple paths to the same track, where each track corresponds to a particular portion of the storage devices 106. For example, a given track may correspond to one or more blocks or sectors of one or more of the storage devices 106. Each track is identified by a corresponding TID. In the example of FIG. 2, the host device 102-1 distributes IO operations across the paths P to a logical volume 206 which is stored in the one or more blocks or sectors of a given track via the controller boards 124 of storage array 105.

Figure 3:
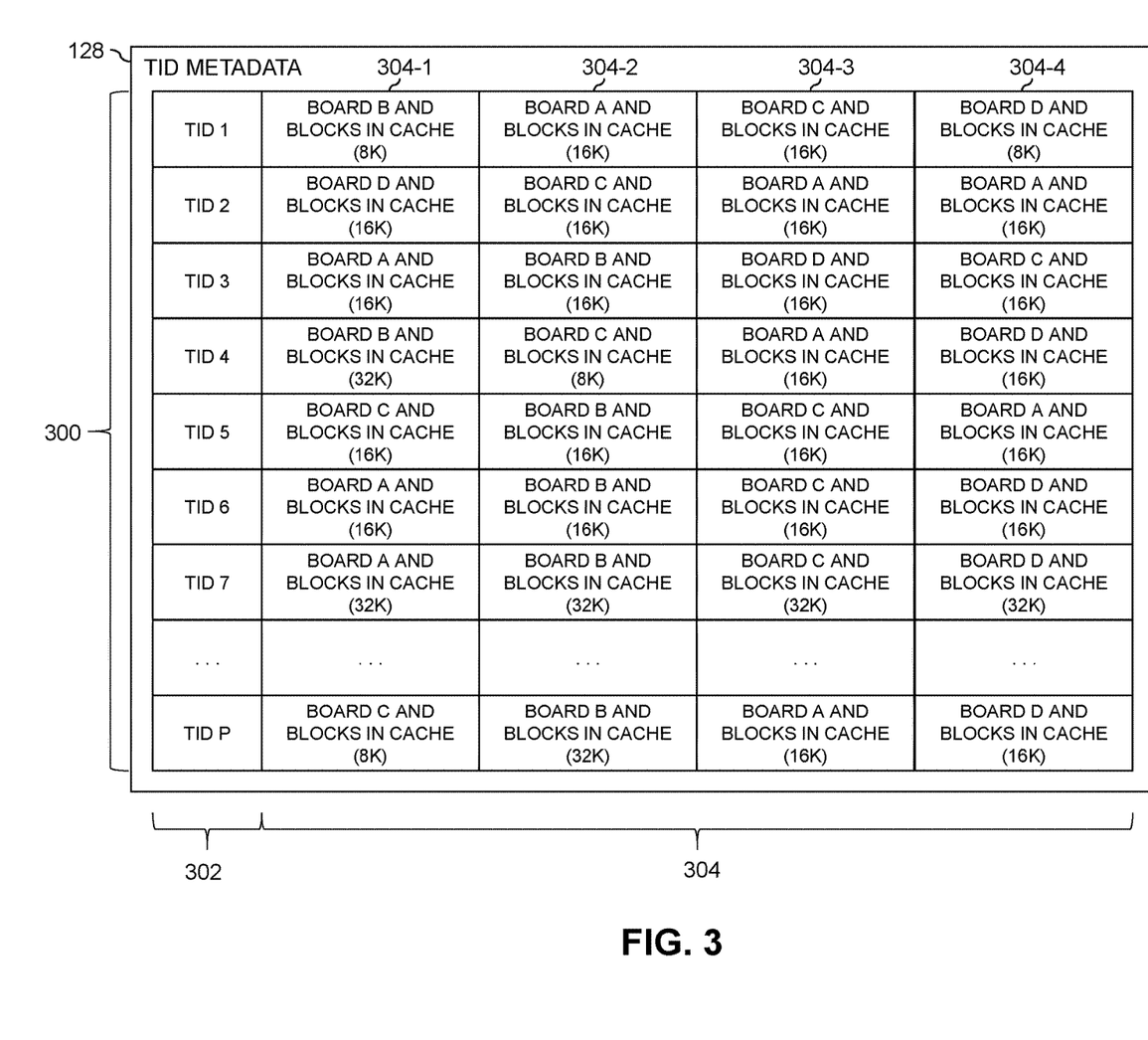
FIG. 3 is a diagram illustrating the example TID metadata structure in an illustrative embodiment.

With reference now to FIGS. 1 and 3, in an illustrative embodiment, an example TID metadata structure 128 comprises a data structure including one or more entries 300 corresponding to one or more of the TIDs of the storage system. For example, TID metadata structure 128 may comprise entries for the last P TIDs for which IO operations were performed where P may be predetermined upon initialization, set by a user, or determined in any other manner. In one example embodiment, each TID of the storage system may have a corresponding entry 300 in the TID metadata structure 128.

Each entry 300 in the TID metadata structure 128 comprises a TID 302 and metadata 304 corresponding to IO operations serviced by the controller boards 124 for that TID 302. As illustrated in the example TID metadata structure 128 of FIG. 3, each entry 300 comprises metadata 304 for the last four IO operations serviced by the controller boards 124 for that corresponding TID 302. In some embodiments, metadata 304 for a larger number of IO operations or smaller number of IO operations for each TID 302 may be included in the TID metadata table 128.

The metadata 304 for a given IO operation comprises an indication of which controller board 124 serviced the given IO operation and an indication of a size of the given IO operation. As an example, the metadata 304 for TID 1 comprises metadata 304-1 through 304-4 which each correspond to an IO operation serviced by the controller boards 124 for the track corresponding to TID 1. In this example, four controller boards 124, labeled controller boards A through D are utilized for TID 1. Metadata 304-1 indicates that controller board B was utilized to service an IO operation having an 8K size for the track corresponding to TID 1. Metadata 304-2 indicates that controller board A was utilized to service an IO operation having a 16K size for the track corresponding to TID 1. Metadata 304-3 indicates that controller board C was utilized to service an IO operation having a 16K size for the track corresponding to TID 1. Metadata 304-4 indicates that controller board D was utilized to service an IO operation having an 8K size for the track corresponding to TID 1. While the entry 300 for TID 1 has IO operations that utilize all four controller boards A through B, an entry need not have all controller boards 124 present. For example, as can be seen by the entry 300 for TID 2, only controller boards A, C and D were utilized in the last four IO operations for the track corresponding to TID 2, where controller board A was utilized twice.

In one example embodiment, metadata 304-1 corresponds to the most recent IO operation for the track corresponding to TID 1 while metadata 304-4 corresponds to the oldest IO operation for which metadata is stored in the entry. For example, when the next IO operation is serviced by the controller boards 124 for the track corresponding to TID 1, the metadata 304-4 may be removed from the entry 300 for TID 1 and the metadata for the next IO operation may be added to the entry 300 for TID 1. While the entries 300 of TID metadata structure 128 are described as having metadata 304 in a most recent to oldest format from left to right (i.e., 304-1 (most recent) through 304-4 (oldest)), TID metadata structure 128 may store the metadata 304 in any other order or manner.

In some embodiments, the metadata 304 in the TID metadata structure 128 for each IO operation may also indicate the type of IO operation, for example, read IO operation or write IO operation. In some embodiments, cache 126 may alternatively store a first TID metadata structure 128 for tracking metadata associated with read IO operations and a second separate TID metadata structure 128 for tracking metadata associated with write IO operations.

From the perspective of storage array 105, it is often difficult to predict which paths the MPIO drivers 112 of the host devices 102 will prefer to utilize for sending the IO operations to the storage array 105. In some cases, it may also be difficult for the storage array 105 to anticipate the IO sizes that will likely be utilized for the IO operations by the MPIO driver.

In one example, such a difficulty may be overcome by having the storage array allocate a buffer having a 128K cache slot size on a local or remote controller board when a new IO operation is received by the storage array without considering whether or not the full 128K buffer is needed to service the IO operation. However, such an over allocation of resources may not be efficient when the IO operations have a significantly smaller size than 128K. For example, allocating a buffer having a 128K cache slot size for a controller board where the IO operation only has a size of 8K or 16K may not be efficient. In another example, the buffer cache slot size may alternatively be allocated based at least in part on the incoming IO size of the IO operation as one way to alleviate the potential over allocation of cache.

Even by allocating the buffer size based on the incoming IO size, some situations may arise where inefficiencies may also be present. For example, if four IO operations are received by the storage array across four different paths for the same target track, four different buffers may be allocated in the cache for these IO operations, one for each IO operation. For example, where four controller boards 124 are present, i.e., controller boards A through D as in the example of FIG. 3, and each controller board 124 is part of one of the four different paths, a buffer is allocated to each board for servicing one of the IO operations. However, given the cost of allocating and binding these four buffers to the four controller boards 124 for the TID 302 corresponding to the target track, e.g., four allocations and bindings to four different controller boards, and also the potential contentions and race conditions that may result from such allocations and bindings, additional system impacts and delays may result. Such additional system impacts and delays associated with allocations and bindings of buffers for servicing IO operations may increase the response time of the storage system 100 and reduce the input-output operations per second (IOPS) of the storage system 100, thereby impacting the performance of the storage system 100.

In an illustrative embodiment, buffer allocation logic 130 is configured with functionality for storage array buffer allocations that utilize the TID metadata structure 128 to alleviate some of these issues. For example, by reading the information about prior IO operations that is stored in the metadata 304 of the TID metadata structure 128, buffer allocation logic 130 can determine which controller boards 124 and corresponding buffer sizes were used to service the prior IO operations for a given track. For example, if the metadata 304 indicates that the host device 102-1 used four paths to read (or write) 8K sequential blocks across different sectors of the track then this may indicate that the host device 102-1 has performed or is in the process of performing a sequential read (or write). If a new 8K read (or write) is received on the same track, buffer allocation logic 130 may analyze the metadata 304 in the TID metadata structure 128 about the prior IO operations and predict that the host device may again be performing a sequential read (or write) and will use four paths to service this read or three additional future reads (or writes) in sequence. In such a case, the storage array may determine that it will be more efficient to allocate a single cache slot size of sufficient size to one of the controller boards 124 to handle all four IO operations in the predicted sequential read (or writes), e.g., 32K, 64K, 128K, 256K or another buffer size. The storage array may then prefetch the corresponding blocks for both the new 8K read (or write) and the predicted future 8K reads (or writes) into the allocated buffer. The use of buffer allocation logic 130 reduces the upfront computational burden on the storage array by allocating one sufficiently large cache slot and buffer on one controller board 124 instead allocating one 8K buffer on one controller board 124 with the likely future allocation of three more additional 8K buffers across three other controller boards 124. The use of buffer allocation logic 130 also reduces the cost on the storage array of binding buffers for each controller board to process the sequential read (or write) IO operation.

With reference again to the example TID metadata structure 128 of FIG. 3, the metadata 304 can be utilized to determine which controller board 124 services which IO operation on a given track as well as the order of the previous IO operations. For example, the metadata 304 for TID 1 indicates that board D serviced the first IO operation for 8K of blocks, board C next serviced another IO operation for the same track for 16K of blocks, followed by board A servicing another IO operation for the same track for 16K of blocks and finally by board B servicing the most recent IO operation for the same track for 8K of blocks. As noted above, while the TID metadata structure 128 is described in the illustrative embodiment as presenting the metadata 304 associated with the most recent IO operation for a given track as the left most metadata, e.g., metadata 304-1, and the metadata associated with the oldest represented IO operation for the given track as the right most metadata, e.g., metadata 304-4, in other embodiments, the TID metadata structure 128 may alternatively represent the relative timing of the IO operations in any other manner.

The TID metadata structure 128 comprises multi-dimensional data (some of which may not be illustrated in FIG. 3). By applying principal component analysis (PCA), the number of dimensions may be reduced to only a few relevant dimensions. In illustrative embodiments, for example, the metadata 304 may be reduced to IO operation size, controller board and IO type (e.g., read or write). Buffer allocation logic 130 may utilize PCA to predict the main component axes of the metadata 304 including, for example, the most likely IO size and most likely controller board or IO path preference of the host device and most likely IO type. For example, the three main principal components described above may be utilized to determine that a given host device submits IO operations that typically have a 16K IO size (which is the first component axis) on controller board A (which is the second component axis) and most of the IO operations are READ IO operations (which is the third component axis).

In the example illustrated in FIG. 3, TID 1 through P may be read by buffer allocation logic 130 using single operation, assuming that there is a negligible cost to read multi track TIDs, to build the PCA model. In some embodiments, if reading multi track TIDs is costly, less than P TIDs may be read and analyzed similarly except that the sample size will be smaller. In such a case, probability may also be utilized to fill out the sample. For example, if P=1 it may be difficult to utilize PCA in a meaningful manner. In such case only one TID having four entries may need to be analyzed. As an example, if the TID has recent IO operations with respective IO sizes of 64K, 8K, 16K and 64K, there is a 50% probability that the next IO operation may have a 64K IO size.

In some cases, the most recent IO operation may be given more weight in predicting the probability of future IO operation sizes as compared to the oldest IO operation in the TID. For example, assuming recency from left to right, the most recent 65K IO operation may be given a 60% weight followed by the next most recent 8K IO operation at a 25% weight, followed by the next most recent 16K IO operation at a 10% weight, followed by the oldest 64K IO operation at a 5% weight. In the above example, the first IO operation having the 64K IO size accounts for 60% of the probability instead of an unweighted 25%, while the last IO operation having the 64K IO size accounts for only 5% of the probability instead of an unweighted 25%. In this case there is a 65% weighted probability of a 64K IO size, a 25% weighted probability of an 8K IO size and a 10% weighted probability of a 16K IO size in the next IO operation. The IO size for the buffer of the controller board may then be selected based on these weighted probabilities, e.g., an IO size of 64K in this example. With the IO size for the buffer determined, in some embodiments, the PCA analysis may be utilized to determine which controller board has the highest probability of receiving an IO operation having the IO size.

In some embodiments, if P=1, the IO operations in the TID may also be reviewed to determine whether they were read or write IO operations to determine a probability of whether the next IO operation will be a read or a write IO operation in a similar manner as described above for the IO sizes. For example, probabilities of read and write IO operations may be determined. In some embodiments, weights may also be utilized based on the recency of the IO operations as described above for the IO sizes. The probability of a read or write IO operation may then be utilized in conjunction with the selected IO size and controller board to determine which type of IO operation the controller board should be configured to receive.

With reference again to FIG. 3, in the example TID metadata structure 128, the illustrated metadata 304 for TIDs 1 through 7 and P indicates that for the IO operations received from the host device, the 8K IO size is utilized 4 times by the host device, the 16K IO size is utilized 22 times by the host device and the 32K IO size is utilized 6 times by the host device. The illustrated metadata 304 also indicates that the most likely controller board to receive an IO operation having the 8K size is board C (2/4) followed by board B (1/4), board D (1/4) and board A (0/4). The illustrated metadata 304 also indicates that the most likely controller board to receive an IO operation having the 16K size is board A (8/22) followed by board C (6/22), board D (5/22) and board B (3/22). The illustrated metadata 304 also indicates that the most likely board to receive an IO operation having the 32K size is board B (3/6) followed by boards A (1/6), C (1/6) and D (1/6). While a PCA analysis of TIDs 1 through 7 and P indicates the above ratios and probabilities in this example, a PCA analysis of more or fewer TIDs may result in different results.

In one example scenario, if an IO operation that is received from the host device 102-1 (on any track) has an IO size of 8K and is sent on a path to controller board B, buffer allocation logic 130 may utilize the PCA analysis of TIDs 1 through 7 and P to determine that the host device 102-1 is likely to submit another IO operation having an IO size of 16K on controller board A in the near future based on the probabilities described above. For example, during the prior IO operations tracked by the TID metadata structure 128, the host device 102-1 generally preferred an IO size of 16K (22/32) and for IO operations having the IO size of 16K, the host device 102-1 generally preferred to utilize controller board A the most often (8/22).

In such a case, buffer allocation logic 130 may determine that it is better to allocate and bind a 16K cache slot to controller board A for buffering the 8K of data associated with the IO operation received by controller board B instead of allocating and binding an 8K cache slot to controller board B. 16K of data may then be retrieved from the storage devices 106 (FIG. 1) which includes both the 8K targeted by the IO request received by the controller board B and another 8K from the same track or another track that is likely to be needed soon. For example, the additional 8K may be the next 8K that is predicted to be needed assuming the IO operation received by the controller board B is part of a sequential read operation. In other embodiments, the additional 8K may be data that is considered to be hot or have a high probability of being needed soon based on any other metric.

Having stored 16K of data in the buffer on controller board A, controller board B may then obtain the 8K of data required for servicing the IO operation from controller board A either through a remote read operation or a remote push operation. In this manner, a future read IO operation which is predicted to target controller board A with a 16K size may either be a local hit on controller board A for the already buffered data or at the very least the 16K buffer is available on controller board A and does not need to be re-allocated or bound to controller board A later. Because the buffer allocation logic 130 is actively utilizing PCA analysis to identify the IO size and controller board that is likely to receive future IO operations, the need to bind and allocate smaller buffers on each individual controller board each time an IO operation is received is mitigated and instead, the buffer allocation and binding operations may be consolidated, for example to the most likely controller board to receive future IO operations and to the IO size most likely to be received.

In some embodiments, buffer allocation logic 130 may perform the PCA analysis for red hot IO paths without the need to offload this work to external chips. In an IO flow where IO response times are an important consideration, using buffer allocation logic 130 to read single or multiple TID's will not increase IO response time significantly. While performing the PCA analysis may add additional CPU instructions, the use of these TID based prediction techniques improves the probability of having the right cache slot size for the buffer and the probability of having the cache slot for the buffer allocated and bound to the right controller board, which will reduce the system burden heavily since fewer allocations and bindings are required and fewer CPU cycles are needed since multiple buffers are not being allocated for the same track. This reduces many of the cache slot contentions and race conditions while also increasing the local hits on the buffers of the controller boards for future IO operations.

In a storage system, an ideal scenario occurs when an incoming IO operation has a local hit on the buffers in the cache. For example, if an IO operation is received by controller board A, ideally controller board A already has the target data for that IO operation stored in its allocated cache buffer. This local hit allows the storage system to quickly return this data to the host device with little overhead in terms of the bandwidth and processing that would be needed to retrieve the data from the storage devices.

Often storage arrays perform asynchronous caching to push the data to the local cache on a given controller board from other controller boards or from the storage devices. Sometimes it may be difficult for the storage array 105 to determine which controller board 124 to push the data to so that future hits on IO operations targeting that controller board can be local hits. In such a scenario, the TID based prediction techniques of the buffer allocation logic 130 described above may also be utilized to determine which controller board 124 the cache slot should be allocated to for buffering the data. The data may then be pushed to that cache slot from the storage devices 106 or from another controller board 124, as needed. In some embodiments, if reading multiple TID's to perform the PCA analysis is too costly, a smaller number of TIDs or even a single TID may be read by buffer allocation logic 130 and the probability of a future IO operation targeting a particular controller board 124 at a particular IO size may be determined by the buffer allocation logic 130, e.g., based on the metadata 304 corresponding to the read TIDs.

In one example scenario, one of the controller boards 124 has received an IO operation and utilizes the TID based prediction techniques of buffer allocation logic 130 to identify another controller board 124 for which to allocate the cache slot for buffering the target data of the IO operation based on the PCA analysis in a similar manner to that described above. For example, where controller board B receives a given IO operation having an IO size of 8K, buffer allocation logic 130 may determine that future IO operations are more likely to target controller board A with an IO size of 16K and may determine that a buffer should be allocated to controller board A with a cache slot size of 16K. The data may then be pushed to the buffer allocated to controller board A, for example, from the storage devices 106 (FIG. 1) or from another one of the controller boards.

With the data that is required to service the given IO operation stored in the buffer allocated to controller board A, buffer allocation logic 130 needs to determine how controller board B can best service the given IO operation. For example, a determination must be made for whether controller board B will perform a remote read on the data now stored in the buffer allocated to controller board A, e.g., read the data from the buffer remotely using the network fabric and provide it to the host device, or if the data stored in the buffer allocated to controller board A will be provided to controller board B via a remote push operation for local storage in a buffer allocated to controller board B to allow for local cache hits on future IO operations that utilize controller board B. If the remote read is selected and the data is not copied and stored in a local buffer for controller board B, subsequent IO operations that utilize controller board B for the same data may also be required to perform the remote read operation, thereby adding a response time cost each time due to the usage of the network fabric to read the data from the remote buffer allocated to controller board A. If the remote push operation is selected, the data is copied to a local buffer allocated to controller board B and the local buffer is utilized to service the IO operation and future IO operations that utilize control board B for the same data. However, allocating and binding the buffer to controller board B also incurs additional costs.

In order to achieve a balance between repeated remote reads versus the cost to allocate and bind a buffer to controller board B, the above TID prediction techniques of buffer allocation logic 130 may be utilized. For example, PCA analysis for one or more TIDs may be utilized to predict the probability of having more IO operations on controller board B for the same data. In some embodiments, the use of remote push or remote read may also be influenced by the host device. For example, if a host bus adapter emulation on the host device for the path or track that utilizes controller board B is highly loaded, performing the remote read will add more cost to the workloads on that host bus adapter further compounding the excessive loads. In such a case, the remote push operation may be utilized to copy the data to the local buffer allocated to controller board B to alleviate the extra response time cost associated with the remote read operation should the highly loaded host bust adapter be utilized for subsequent IO operations. In some embodiments, host bust adapter CPU utilization rates and EDS utilization rates may be used in conjunction with the PCA analysis of the TIDs to determine whether to do a remote read operation or a remote push operation.

The above described TID based prediction techniques may be applied to some or all of the IO operations that are received by the storage array where at any given point in time there might be thousands of IO operations in the system. Grouping and analyzing TID metadata 304 for thousands of such IO operations using PCA analysis provides an indication of the current workload on the storage array as well as what actions were taken by the host device for previous IO operations on the respective tracks. The information contained in the metadata 304 may be utilized with PCA analysis to further classify system workload sizes such as, e.g., 8K, 16K, 32K, 64K, 128K or 256K IO sizes, into preferred controller boards, paths and IO Types. For example, the storage array can better predict the required bank size for each of the IO slot sizes for future IO operations, e.g., the number of buffers allocated to each IO slot size in the cache 126 or the amount of memory allocated to each IO slot size in the cache 126.

As an example, a portion of cache 126, e.g., a predetermined number of megabytes (MB), gigabytes (GB), terabytes (TB) or any other amount of memory, may be designated for use in buffer allocations of the various IO slot sizes. The designated portion of the cache 126 for each IO slot size is sometimes referred to as the bank size for that IO slot size. The bank size for a given IO slot size determines the number of available buffers of that IO slot size. For example, for a bank size of 1024 megabytes (MB), an IO slot size of 8K would have 128,000 available buffers, an IO slot size of 16K would have 64,000 available buffers, an IO slot size of 32K would have 32,000 available buffers, an IO slot size of 64K would have 16,000 available buffers, an IO slot size of 128K would have 8,000 available buffers or an IO slot size of 256K would have 4,000 available buffers.

In some storage arrays, the bank size for each IO slot size may be the same where, for example, the portion of the cache 126 designated for use in buffer allocations may be divided equally by the number of different IO slot sizes to determine the bank sizes. While such a configuration is simple to implement, it may not provide the most efficient use of the designated portion of the cache. For example, if a particular IO slot size such as, e.g., the 16K IO slot size, experiences high usage rates while another IO slot size such as, e.g., the 256K IO slot size, experiences low usage rates, it may be more efficient to increase the bank size of the 16K IO slot size at the cost of decreasing the bank size of the 256K IO slot size.

In illustrative embodiments, the buffer allocation logic 130 and above mentioned TID based prediction techniques may be utilized to determine whether the bank sizes of the various IO slot sizes should be increased or decreased. For example, the metadata 304 of the TID metadata structure 128 may be analyzed using the PCA analysis mentioned above to determine the portions or percentages of the most recent IO operations that have each IO size. For example, as described above with reference to FIG. 3, the illustrated metadata 304 for TIDs 1 through 7 and P indicates that for the IO operations received from the host device, the 8K IO size is utilized 4 times (4/32) by the host device, the 16K IO size is utilized 22 times (22/32) by the host device and the 32K IO size is utilized 6 times (6/32) by the host device. Based on this information, the amount of the designated portion of the cache 126 that is allocated as the bank size for each of the IO slot sizes may be determined and, in some embodiments, dynamically adjusted during operation.

In the above described example, 32K worth of 8K IO slot size buffers were needed to service the most recent IO operations having the 8K IO size, 352K worth of 16K IO slot size buffers were needed to service the most recent IO operations having the 16K IO size and 192K worth of 32K IO slot size buffers were needed to service the most recent IO operations having the 32K IO size for a total of 576K. The percentage of the total utilized for each IO slot size in the example then becomes 5% for the 8K IO slot size, 61% for the 16K IO slot size and 33% for the 32K IO slot size. In some embodiments, this % of usage may be utilized to determine the amount of the designated portion of the cache 126 that is allocated for use as buffers for the various IO slot sizes. For example, the bank size of the 8K IO slot size may be adjusted to be 5% of the designate portion of the cache 126, the bank size of the 16K IO slot size may be adjusted to be 61% of the designate portion of the cache 126 and the bank size of the 32K IO slot size may be adjusted to be 33% of the designate portion of the cache 126. Where additional IO slot sizes are utilized, other percentages may be utilized.

In some embodiments, the designated portion of the cache 126 may have a minimum amount allocated to the bank size for each IO slot size. For example, even if only 5% of the designated portion of the cache 126 is allocated to the bank size for the 8K IO slot size, in some embodiments, a minimum of 10% may be allocated to the bank size of the 8K IO slot size to account for potential changes to the IO load pattern of the storage array.

In some embodiments, as the storage system continues to receive and service new IO operations, the bank sizes may be dynamically adjusted based on the metadata 304 associated with the most recent IO operations in a similar manner. For example, if the portion of IO operations having the 8K IO slot size that are received increases significantly over time, the allocated bank size for the 8K IO slot size in the of the designated portion of the cache 126 may be increased while the allocated bank size for one or more of the other IO slot sizes may be decreased. Such a dynamic adjustment of the bank sizes will increase the efficiency of the memory utilization and thus reduce system burden such as, e.g., the need for faster destaging and fewer slot contentions etc.

Illustrative embodiments of the techniques and functionality of buffer allocation logic 130 will now be described in more detail with reference to the flow diagram of FIG. 4.

Figure 4:
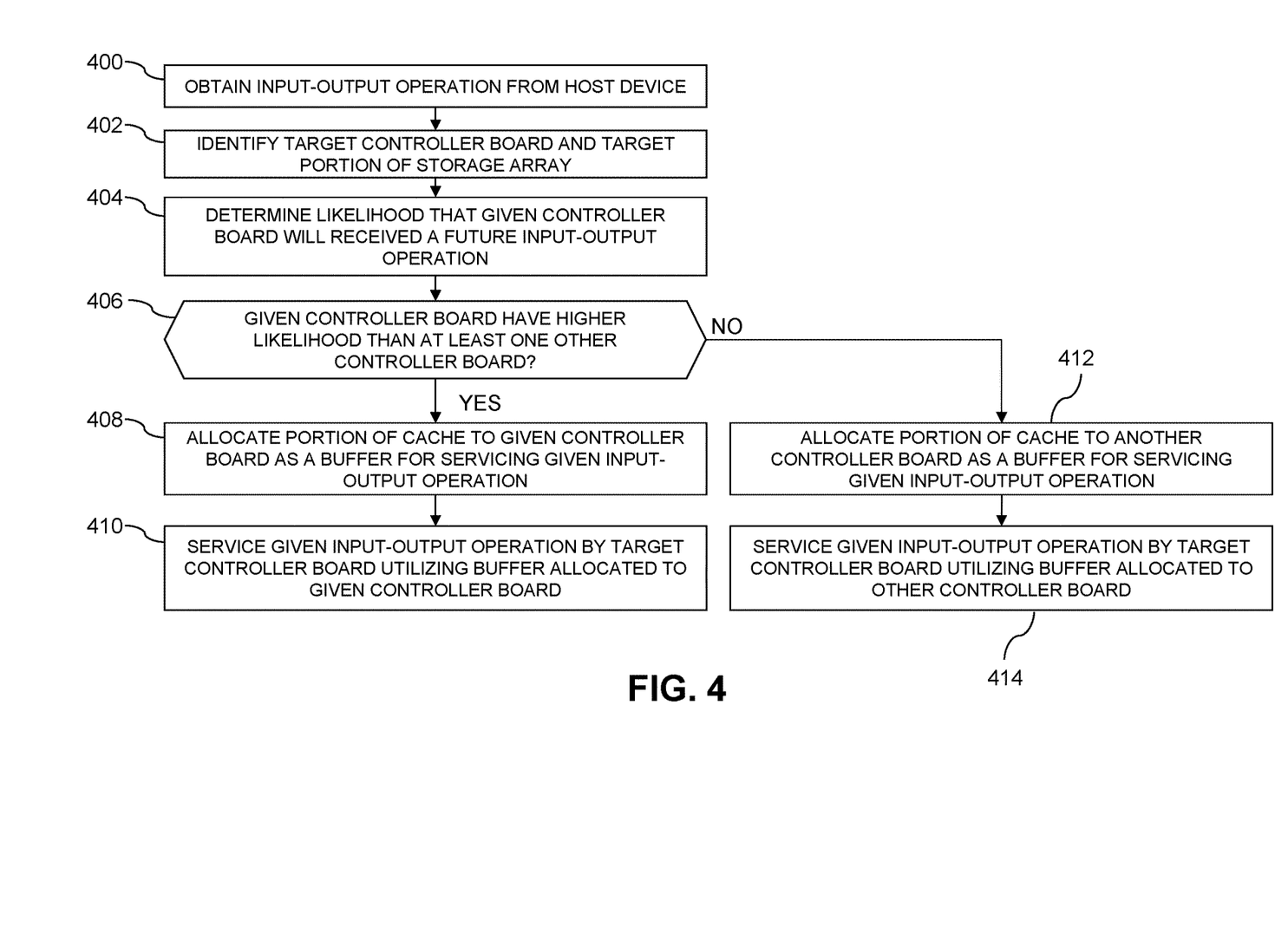
FIG. 4 is a flow diagram of an example cache buffer allocation process in an illustrative embodiment.

The process as shown in FIG. 4 includes steps 400 through 414 and is suitable for use in the system 100 but is more generally applicable to other types of systems comprising multiple host devices and a shared storage system. The process will be described with reference also to FIGS. 1-3.

At 400, the storage array obtains a given IO operation from a host device. For example, one of the controller boards 124 of the storage array 105 may obtain the given IO operation from the host device 102-1.

At 402, buffer allocation logic 130 identifies a target controller board of the plurality of controller boards 124 and a target portion of the storage array 105 based at least in part on the obtained given IO operation. For example, the target controller board may comprise the controller board that obtains the IO operation and the target portion of the storage array 105 may comprise the target logical volume or track of the storage array for which is targeted by the IO operation.

At 404, buffer allocation logic 130 determines, based at least in part on the metadata 304 stored in the metadata structure 128, a likelihood that a given controller board of the plurality of controller boards 124 will receive a future IO operation.

At 406, buffer allocation logic 130 determines, based at least in part on the determined likelihood, whether the given controller board has a higher likelihood of receiving a future IO operation than at least one other controller board of the plurality of controller boards 124. In some embodiments, buffer allocation logic 130 may determine whether the given controller has the highest likelihood of receiving a future IO operation. As described above, in some embodiments, the likelihood may comprise a probability generated based at least in part on the metadata 304.

If the given controller board has a higher likelihood of receiving a future IO operation than at least one other controller board of the plurality of controller boards 124, the method proceeds to 408 and a portion of the cache 126 is allocated to the given controller board as a buffer for servicing the IO operation. In some embodiments, the buffer may comprise an IO size type determined based at least in part on the metadata 304 that may be different than an IO size of the obtained IO operation.

At 410, buffer allocation logic 130 causes the given input-output operation to be serviced by the target controller board utilizing the buffer allocated to the given controller board.

Referring back to 406, if the given controller board does not have a higher likelihood of receiving a future IO operation than at least one other controller board of the plurality of controller boards 124, the method proceeds to 412 and a portion of the cache 126 is allocated to the at least one other controller board as a buffer for servicing the obtained IO operation. In some embodiments, the allocated buffer may comprise an IO size type determined based at least in part on the metadata 304 that may be different than an IO size of the obtained IO operation.

At 414, buffer allocation logic 130 causes the given input-output operation to be serviced by the target controller board utilizing the buffer allocated to the other controller board.

Separate instances of the FIG. 4 process may be performed in respective additional host devices that share the storage array.

The particular processing operations and other system functionality described in conjunction with the flow diagram of FIG. 4 are presented by way of illustrative example only, and should not be construed as limiting the scope of the disclosure in any way. Alternative embodiments can use other types of processing operations involving host devices, storage systems and buffer allocation logics. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different buffer allocation logic arrangements within a given information processing system.

Functionality such as that described in conjunction with the flow diagram of FIG. 4 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for storage array buffer allocations using TID metadata are carried out at least in part under the control of its buffer allocation logic 130. For example, buffer allocation logic 130 is illustratively configured to control performance of portions of the processes shown in the flow diagram described above in conjunction with FIG. 4.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support storage array buffer allocations using TID metadata.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeOF.

As indicated previously, absent use of functionality for storage array buffer allocations using TID metadata as disclosed herein, buffers of various sizes will be allocated to the controller boards of a given track for each received IO operation. This leads to inefficiencies in the storage system as well as in the storage array servicing the IO operations.

Such drawbacks are advantageously overcome in illustrative embodiments herein by utilization of buffer allocation logic 130 to implement functionality for storage array buffer allocations using TID metadata as described above. For example, the disclosed techniques allow the storage array to allocate fewer buffers for servicing IO operations while allocating those buffers to the controller boards that are most likely to see future IO operations for the same track. The disclosed techniques also allow the storage array to dynamically manage the bank sizes allocated to the buffers for each IO size during operation which increases the efficiency of the storage array since more memory will be available for buffers having active IO sizes while less memory will be wasted being allocated for buffers having IO sizes that are less active.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, sets of IO queues 110, MPIO drivers 112, controller boards 124, cache 126, and TID metadata structure 128 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the buffer allocation logic 130 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers and additional or alternative components. Also, the particular configurations of system and device elements and associated processing operations illustratively shown in the drawings can be varied in other embodiments. For example, a wide variety of different MPIO driver configurations and storage array arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a storage array comprising a plurality of controller boards and a cache, the cache comprising a metadata structure, the metadata structure storing metadata associated with a plurality of prior input-output operations, each of the prior input-output operations being directed to a corresponding portion of the storage array, the metadata associated with each prior input-output operation comprising an indication of which of the plurality of controller boards was utilized to service that prior input-output operation and an input-output size for that prior input-output operation, at least one processing device of the storage array being configured:
to obtain a given input-output operation from a host device;
to identify a target controller board of the plurality of controller boards and a target portion of the storage array based at least in part on the obtained given input-output operation;
to determine, based at least in part on the metadata stored in the metadata structure, a likelihood that a given controller board of the plurality of controller boards will receive a future input-output operation;
to determine, based at least in part on the likelihood, that the given controller board has a higher likelihood of receiving a future input-output operation than at least one other controller board of the plurality of controller boards;
to allocate a portion of the cache to the given controller board as a buffer for storing target data associated with the given input-output operation; and
to service the given input-output operation by the target controller board, the target controller board utilizing the buffer to service the input-output operation.

2. The apparatus of claim 1 wherein the at least one processing device is further configured to determine, based at least in part on the metadata stored in the metadata structure, a most likely input-output size for the future input-output operation and wherein the at least one processing device is configured to allocate the portion of the cache as the buffer with a size corresponding to the determined most likely input-output size.

3. The apparatus of claim 1 wherein determining, based at least in part on the metadata structure, the likelihood that the given controller board of the plurality of controller boards will receive the future input-output operation comprises performing a principal component analysis on the metadata.

4. The apparatus of claim 1 wherein the metadata structure comprises a plurality of tracks, each track comprising metadata corresponding to one or more of the plurality of prior input-output operations, each track corresponding to a particular portion of the storage array.

5. The apparatus of claim 1 wherein the cache comprises a plurality of banks, each of the banks being designated as a bank for buffers of a corresponding input-output size, the at least one processing device being further configured to dynamically adjust the size of one or more of the banks based at least in part on the metadata stored in the metadata structure.

6. The apparatus of claim 1 wherein the at least one processing device is further configured:
to obtain one or more utilization rates from the host device;
to determine, based at least in part on the obtained one or more utilization rates and the metadata stored in the metadata structure, whether the target controller board should perform a remote read of the target data from the buffer of the given controller board or a remote push should be performed to copy the target data from the buffer of the given controller board to a buffer of the target controller board for servicing the given input-output operation; and
to cause performance of one of the remote read operation and the remote push operation based at least in part on the determination of whether the target controller board should perform the remote read or the remote push should be performed.

7. The apparatus of claim 1 wherein the at least one processing device is further configured to perform asynchronous pre-caching of data on the plurality of controller boards based at least in part on the metadata stored in the metadata structure.

8. A method comprising:
obtaining a given input-output operation from a host device;
identifying a target controller board of a plurality of controller boards of a storage array and a target portion of the storage array based at least in part on the obtained given input-output operation;
determining, based at least in part on metadata stored in a metadata structure of the storage array, a likelihood that a given controller board of the plurality of controller boards will receive a future input-output operation, the metadata being associated with a plurality of prior input-output operations, each of the prior input-output operations being directed to a corresponding portion of the storage array, the metadata associated with each prior input-output operation comprising an indication of which of the plurality of controller boards was utilized to service that prior input-output operation and an input-output size for that prior input-output operation;
determining, based at least in part on the likelihood, that the given controller board has a higher likelihood of receiving a future input-output operation than at least one other controller board of the plurality of controller boards;

allocating a portion of the cache to the given controller board as a buffer for storing target data associated with the given input-output operation; and servicing the given input-output operation by the target controller board, the target controller board utilizing the buffer to service the input-output operation;

wherein the method is performed by at least one processing device of the storage array.

9. The method of claim 8 wherein the method further comprises determining, based at least in part on the metadata stored in the metadata structure, a most likely input-output size for the future input-output operation and wherein the at least one processing device is configured to allocate the portion of the cache as the buffer with a size corresponding to the determined most likely input-output size.

10. The method of claim 8 wherein determining, based at least in part on the metadata structure, the likelihood that the given controller board of the plurality of controller boards will receive the future input-output operation comprises performing a principal component analysis on the metadata.

11. The method of claim 8 wherein the metadata structure comprises a plurality of tracks, each track comprising metadata corresponding to one or more of the plurality of prior input-output operations, each track corresponding to a particular portion of the storage array.

12. The method of claim 8 wherein the cache comprises a plurality of banks, each of the banks being designated as a bank for buffers of a corresponding input-output size, the method further comprising dynamically adjusting the size of one or more of the banks based at least in part on the metadata stored in the metadata structure.

13. The method of claim 8 wherein the method further comprises:

obtaining one or more utilization rates from the host device;

determining, based at least in part on the obtained one or more utilization rates and the metadata stored in the metadata structure, whether the target controller board should perform a remote read of the target data from the buffer of the given controller board or a remote push should be performed to copy the target data from the buffer of the given controller board to a buffer of the target controller board for servicing the given input-output operation; and causing performance of one of the remote read operation and the remote push operation based at least in part on the determination of whether the target controller board should perform the remote read or the remote push should be performed.

14. The method of claim 8 wherein the method further comprises performing asynchronous pre-caching of data on the plurality of controller boards based at least in part on the metadata stored in the metadata structure.

15. A computer program product comprising a non-transitory processor-readable storage medium having stored therein program code of one or more software programs, wherein the program code, when executed by at least one processing device of a storage array, the storage array comprising a plurality of controller boards and a cache, the cache comprising a metadata structure, the metadata structure storing metadata associated with a plurality of prior input-output operations, each of the prior input-output operations being directed to a corresponding portion of the storage array, the metadata associated with each prior input-output operation comprising an indication of which of the plurality of controller boards was utilized to service that prior input-output operation and an input-output size for that prior input-output operation, causes the at least one processing device:

to obtain a given input-output operation from a host device;

to identify a target controller board of the plurality of controller boards and a target portion of the storage array based at least in part on the obtained given input-output operation;

to determine, based at least in part on the metadata stored in the metadata structure, a likelihood that a given controller board of the plurality of controller boards will receive a future input-output operation;

to determine, based at least in part on the likelihood, that the given controller board has a higher likelihood of receiving a future input-output operation than at least one other controller board of the plurality of controller boards;

to allocate a portion of the cache to the given controller board as the buffer for storing target data associated with the given input-output operation; and to service the given input-output operation by the target controller board, the target controller board utilizing the buffer allocated to the given controller board to service the input-output operation.

16. The computer program product of claim 15 wherein the program code further causes the at least one processing device to determine, based at least in part on the metadata stored in the metadata structure, a most likely input-output size for the future input-output operation and wherein the at least one processing device is configured to allocate the portion of the cache as the buffer with a size corresponding to the determined most likely input-output size.

17. The computer program product of claim 15 wherein determining, based at least in part on the metadata structure, the likelihood that the given controller board of the plurality of controller boards will receive the future input-output operation comprises performing a principal component analysis on the metadata.

18. The computer program product of claim 15 wherein the metadata structure comprises a plurality of tracks, each track comprising metadata corresponding to one or more of the plurality of prior input-output operations, each track corresponding to a particular portion of the storage array.

19. The computer program product of claim 15 wherein the cache comprises a plurality of banks, each of the banks being designated as a bank for buffers of a corresponding input-output size, the program code further causing the at least one processing device to dynamically adjust the size of one or more of the banks based at least in part on the metadata stored in the metadata structure.

20. The computer program product of claim 15 wherein the program code further causes the at least one processing device:

to obtain one or more utilization rates from the host device;

to determine, based at least in part on the obtained one or more utilization rates and the metadata stored in the metadata structure, whether the target controller board should perform a remote read of the target data from the buffer of the given controller board or a remote push should be performed to copy the target data from the buffer of the given controller board to a buffer of the target controller board for servicing the given input-output operation; and to cause the performance of one of the remote read operation and the remote push operation based at least in part on the determination of whether the target controller board should perform the remote read or the remote push should be performed.

* * * * *